United States Patent [19]

Wirth

[11] 4,392,837
[45] Jul. 12, 1983

[54] ROTARY DRIVE COUPLING

[75] Inventor: Charles J. Wirth, West Granby, Conn.

[73] Assignee: Kamatics Corporation, Bloomfield, Conn.

[21] Appl. No.: 206,695

[22] Filed: Nov. 14, 1980

[51] Int. Cl.³ .............................................. F16D 3/62
[52] U.S. Cl. ..................................................... 464/69
[58] Field of Search .......................... 64/12, 13, 19, 31; 464/69, 51, 87, 106

[56] References Cited

U.S. PATENT DOCUMENTS

| 2,770,113 | 11/1956 | Nelles ....................................... 64/12 |
| 3,004,409 | 10/1961 | Grey ......................................... 64/12 |
| 3,481,158 | 12/1969 | Mayerjak ................................. 64/12 |
| 3,592,021 | 7/1971 | Mayerjak ................................. 64/12 |

FOREIGN PATENT DOCUMENTS

| 2725289 | 12/1978 | Fed. Rep. of Germany .......... 64/12 |
| 172178 | 12/1921 | United Kingdom ..................... 64/12 |

OTHER PUBLICATIONS

Spotts, Design of Machine Elements, 4th Ed., p. 20, 1971.

Primary Examiner—Ira S. Lazarus
Assistant Examiner—Magdalen Moy
Attorney, Agent, or Firm—McCormick, Paulding & Huber

[57] ABSTRACT

A flexible coupling for drivingly connecting two rotatable shafts or the like, and for use in applications where torque is transmitted only in one direction of rotation or where the torque transmitted in one direction of rotation is significantly greater than the torque transmitted in the other direction of rotation, includes a flex member consisting of four elongated flex elements fixedly joined together in a unitary rectangular arrangement. The two elements positioned on opposite sides of the rectangular arrangement are of substantially rectangular cross-sectional shape along a major portion of element length, and the elements of one such pair are thicker than the elements of the other pair. The flex member is connected between the two rotatable shafts in a manner which causes the thicker elements to be in compression and the thinner elements to be in tension during torque transmission in the favored direction. The difference in element thickness provides a more stable flex member structure, reducing unwanted spurious deflections and thereby improving the capacity for useful deflections associated with driving and driven member misalignments. The coupling may include only a single flex member or may have a number of such members connected in series to increase its misalignment capabilities.

6 Claims, 5 Drawing Figures

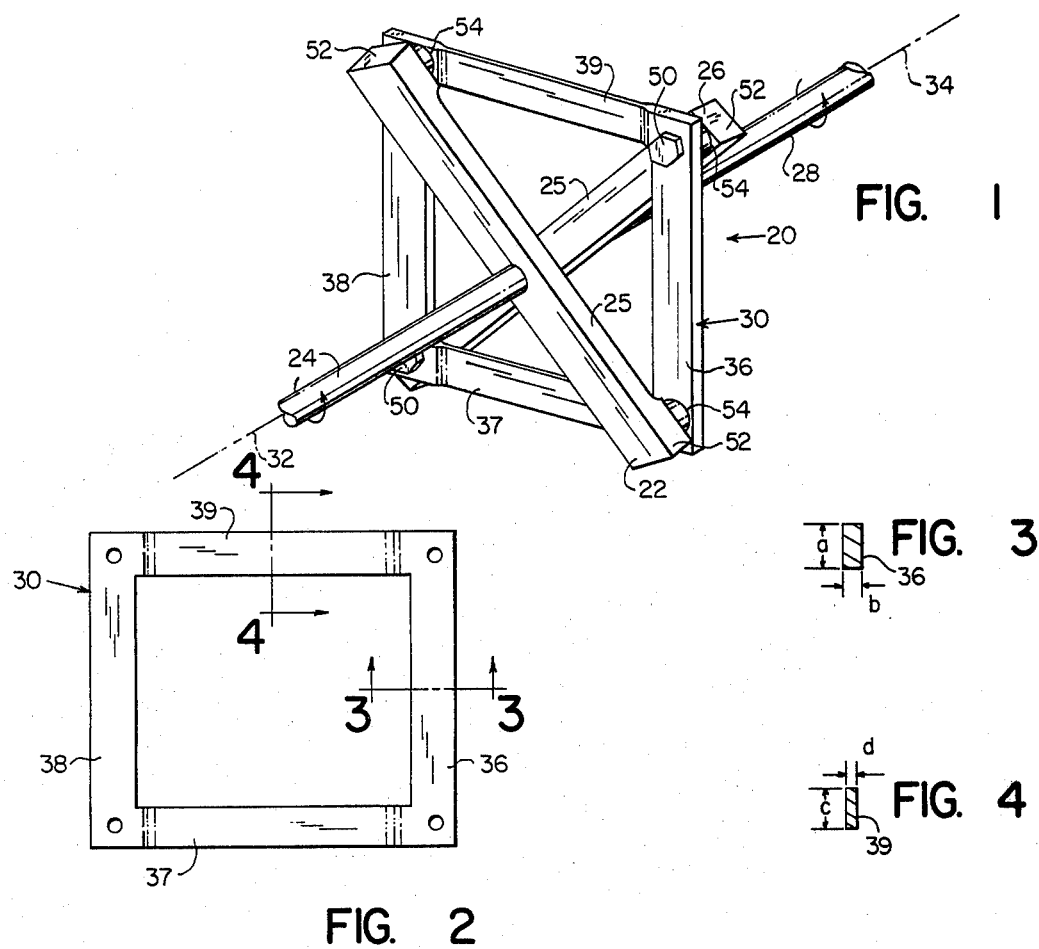
FIG. 1
FIG. 2
FIG. 3
FIG. 4
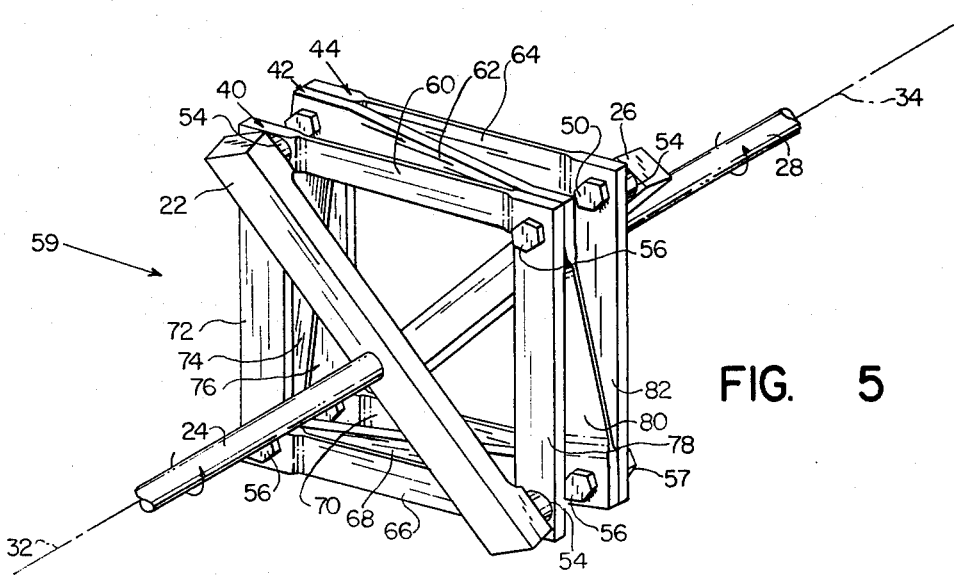
FIG. 5

ROTARY DRIVE COUPLING

BACKGROUND OF THE INVENTION

This invention relates to flexible couplings for joining two rotatable shafts or other rotating parts which may have their rotation axes endwise or axially misaligned and wherein torque is transmitted predominantly in one direction of rotation, and deals more particularly with such a coupling which can accommodate a substantial amount of angular and endwise misalignment while transmitting high amounts of power within a relatively small space envelope.

This invention further relates to improvements in the type of coupling shown generally by U.S. Pat. No. 3,481,158 and No. 3,592,021 and which improvements are particularly useful in cases where the coupling is used to transmit torque in only one direction of rotation or where the coupling is used to transmit a significantly higher amount of torque in one direction of rotation than in the other direction.

Flexible couplings are commonly used for joining two rotatable shafts or parts in a rotary power transmitting system. Of the two shafts or parts, one is a driving member and the other a driven member. The type of coupling to which this invention relates is one having a flex member with four elongated elements joined together in a rectangular arrangement and rigidly fixed at two opposite corners of the arrangement to the driving member while the remaining corners are rigidly fixed to the driven member. Shaft misalignment, both angular and endwise, is accommodated by bending of the elements of the flex member. Desirable features associated with this type of coupling include the ability to operate without lubrication thereby avoiding the environmental constraints imposed by lubricants, freedom from backlash and induced variations in rotational speed, and the ability to flex through substantial misalignment while providing a relatively rigid load path for transmitted torque. Flexible couplings of this type may be of relatively simple design while being capable of meeting the drive torque and flexing requirements for many shaft joinder applications.

During use of a coupling of the type in question, the rectangular flex member has two opposite flex elements which are in compression while its other two flex elements are in tension. As transmitted driving torque is increased the compressive flex elements tend to bow due to increased column loading. This bowing of the compressive elements also causes related distortion of the tension elements and thereby produces increased stress in all four elements which diminishes the capacity of the elements to withstand misalignment. As a result, either torque or misalignment which the coupling can handle is reduced. Bowing of the compressive elements and the attendant distortion of the tension elements also leads to vibratory forces which interfere with smooth rotation which is essential for high speed operation. An increase in material stiffness or general additional thickness of the flex member can reduce the compressive element bowing, but such measures are counter-productive to maintaining the flexing capacity of the coupling.

Therefore, an object of this invention is to provide improvements to flexible couplings of the type in question whereby the performance of the coupling with regard to torque, speed, service life and size is made better without seriously impairing the flexing capability of its flex member or members. Or alternatively, another object of this invention is the provision of a flexible coupling with the capacity to perform under conditions of power transmission and misalignment which exceed the conditions capable of being handled by present couplings.

It is another object of this invention to provide a flexible coupling of such structural efficiency that the cost of a coupling for a particular application may be reduced.

SUMMARY OF THE INVENTION

This invention concerns a flexible coupling having portions adapted for connection to a rotatable driving member and portions adapted for connection to a rotatable driven member. In the neutral condition of the coupling the axis of rotation of the drive and driven member are generally colinear. This invention especially resides in a flex member located between and drivingly connecting the driving member to the driven member for transmission of torque predominantly in one direction. The flex member has four elongated elements fixedly joined together in a unitary rectangular arrangement and fixed at two opposing corners of the arrangement to the driving member and fixed at the remaining corners to the driven member. Each element forming a side of the arrangement is substantially rectangular in cross-section and has substantially the same cross-sectional width and thickness dimension as the element on the opposite side of the arrangement along a major portion of its length. Of the pairs of opposing elements, one pair has a larger cross-sectional thickness than the other pair of elements.

When the flex member of this invention is fastened between the driving and driven members, and the members are rotated in the direction of predominant torque transmission, the pair of opposing flex member elements which are in compression are the ones which have the larger thickness. This difference in thickness suits the different stress and deflection behavior of each of the flex member elements under load. Since the compressive elements have a tendency to bow, the greater thickness of these elements adds stiffness to reduce such bowing and the accompanying stresses applied to the material; and since the bowing tendency is not present in the tension elements, the lesser thickness of these elements adds to the flexibility to better accommodate the misalignment to which the coupling is subjected.

The invention also resides in a flexible coupling including a number of flex members connected in series with one another to accommodate even greater shaft angular and endwise misalignment than could be accommodated by a single flex member, the series of flex members including at least one flex member having the aforedescribed difference in thickness of the compression and tension elements.

It can be noticed that the improved structural efficiency of the flex member of this invention allows, for a given application, a reduced flexible coupling cost through the use of lower strength and less costly flex member materials or through a reduction in the number of flex members in a series, if a series of flex members is required for a particular application.

BRIEF DESCRIPTION OF THE DRAWINGS

FIG. 1 is a perspective view of an embodiment of the flexible coupling of the present invention.

FIG. 2 is a plan view of the flex member of the coupling of FIG. 1.

FIG. 3 is a cross-sectional view of an element of the flex member as seen along the line 3—3 of FIG. 2.

FIG. 4 is a cross-sectional view of an element of the flex member as seen along the line 4—4 of FIG. 2.

FIG. 5 is a perspective view of a flexible coupling comprising another embodiment of the invention and having a plurality of flex members connected in series.

DETAILED DESCRIPTION OF THE PREFERRED EMBODIMENTS

FIG. 1 shows a flexible coupling, indicated generally at 20, embodying the present invention. Referring to this figure, the coupling 20 includes a driving member 22 fixed to a drive shaft 24 and a driven member 26 fixed to a driven shaft 28. Connected between the driving member 22 and the driven member 26 is a flex member 30. In FIG. 1 the coupling is shown in a neutral condition at which the rotation axis 32 of the driving shaft 24 and the rotation axis 34 of the driven shaft 28 are substantially colinear and at which the parts of the flex member 30 are all located substantially in a plane perpendicular to the axes 32 and 34. From the neutral condition of FIG. 1, however, the axes 32 and 34 may be shifted to a substantial degree of angular misalignment and the driving and driven members may be moved endwise toward and away from one another with such changes being accommodated by bending of various portions of the flex member.

The flex member 30 consists of four elongated elements 36, 37, 38, 39 fixedly joined together at their ends to form a unitary rectangular arrangement as shown in FIG. 2. All of the elongated elements are made of elastically bendable material such as metal or plastic. The four elements 36, 37, 38, 39 may be initially separate parts fixed to one another by welding, riveting, or other means, but preferably the flex member is of a one-piece construction which may be achieved by cutting the member from a single piece of metal or plastic or by forming the member from metal or plastic through a casting or molding process.

Referring to FIG. 1, the driving and driven members 22 and 26 may take various forms, but as shown are similar to one another with each including a body portion 25 and two protrusions 52, 52 (only three shown). The two protrusions 52, 52 are located on opposite sides of the associated axis 32 or 34, and at equal distances from such axis, and extend axially toward the flex member 30.

The flex member 30 has two corners, diagonally opposite to one another in the rectangular arrangement, which are connected to the driving member 22 and two remaining corners which are connected to the driven member 26. The corners are rigidly fixed to the driving and driven members so that all misalignment of the joined shafts is accommodated by the bending of the flex member elements without any sliding or otherwise relative movement between the corners and the members. Each corner of the rectangular arrangement is apertured as shown in FIG. 2 to receive the shank of a headed threaded fastener 50. In the assembled coupling, as shown in FIG. 1, each fastener 50 (only two shown) passes through the associated aperture of the flex member 30 and is threadably received by the associated protrusion 52 (only three shown) whereby the associated corner of the member 30 is held in tight and fixed engagement with the protrusion 52 by being clamped between the protrusion and the head of the fastener. If desired, a spacer 54 (only three shown) may also be used between each corner and its associated protrusion 52.

When the shaft coupling 20 is transmitting power from the driving member 22 to the driven member 26 and rotating in the direction shown by the arrows in FIG. 1, two elongated elements 36, 38 located on opposite sides of the rectangular arrangement are in compression and the remaining elements 37, 39, also located on opposite sides of the rectangular arrangement, are in tension. The compressive force in the elements 36 and 38 tends to bow these elements due to column loading. Should the rotational axes 32 and 34 be misaligned as aforedescribed, all four elements will bend out of the neutral plane to accommodate such misalignment, and the effect of the compressive force in causing bowing of the compression element 36 and 38 will be magnified. The bowing of the compressive elements which does occur causes, and is partially resisted by, related deformation of the tension elements so that corresponding undesirable stresses are produced in all of the elements. Further, if all four elements were exactly identical to one another the stresses produced in the compressive elements would be significantly higher than the stresses produced in the tension elements.

In accordance with the invention, in the flex member 30 the two compressive elements and the two tension elements are differently shaped. More particularly, all four elements are of substantially rectangular cross section along the major portion of their lengths, but the tension elements and the compression elements are of differential thicknesses. That is, the two compressive elements 36 and 38, which are of substantially the same cross-section relative to one another, are thicker than the two tension elements 37 and 39, which are also of substantially the same cross section relative to one another. As shown in FIGS. 3 and 4 each compressive element has a width a and a thickness b, and each tension element has a width c and a thickness d. The thickness b of the compressive elements is substantially greater than the thickness d of the tension elements. Also, the width a of the compressive element is substantially equal to the width c of the tension elements, but this is not a necessary condition and either the compressive elements or the tension elements may be wider than the other elements.

The thicker nature of the compressive elements makes them relatively stiff to column loading and thereby relatively low stresses are produced in them due to bowing deformation. Since bowing of the compressive elements is low, related deformation and stress of the tension elements is similarly low. The larger thickness of the compressive elements in comparison to the tension elements makes them stiffer than the tension elements to bending caused by misalignment of the driving and driven parts, but any adverse influence this has is slight and is more than offset by overall improved performance achieved through the more equal distribution and reduction of stresses in the flex elements.

In addition to using only a single flex member as in the coupling 20 of FIG. 1, a coupling in accordance with this invention may alternately include two or more flex members connected in series to increase its misalignment capability. One such coupling 59 is shown in FIG. 5 and includes three flex members 40, 42, 44, each generally similar to the flex member 30 of the coupling 20 of FIG. 1 except that all parts or elements of each flex member do not lie in a plane. Other parts of the coupling 59 which are similar to that of the coupling of FIG. 1 have been given the same reference numerals as in FIG. 1 and need not be further described. Two opposite corners of the flex member 44 are rigidly connected to the driven member 26 by headed threaded fasteners, such as the one shown at 50, and two opposite corners of the flex member 40 are similarly rigidly connected to the driving member 22. Two opposite corners of flex member 42 are rigidly connected to adjacent corners of flex member 40 and the remaining pair of corners of flex member 42 are connected to adjacent corners of flex member 44. If desired, and as illustrated, spacers 54 may be placed between the corners of the flex members 40 and 44 and the driving and driven members 22 and 26. The adjacent corners of adjacent flex members 40, 42 and 42, 44 are rigidly held together by headed threaded fasteners 56 inserted through the corner apertures and receiving associated tightened nuts 57.

With this arrangement, two generally helical sets of flex elements are in tension during transmission of torque from the driving member to the driven member as they rotate in the direction shown by the arrows one such tension set comprising the elements 60, 80 and 70 and the other such tension set comprising the elements 66, 74 and 64. At the same time, two generally helical sets of flex elements are in compression with one such compression set comprising the elements 72, 68 and 82 and the other elements 78, 62 and 76. In accordance with the invention, the flex members are arranged so that the tension elements are the thinner ones and the compressive elements the thicker ones, as evident from FIG. 5.

The foregoing descriptions are intended as illustration and not as limitation, and various changes, substitutions and derivations may be made in and from the illustrated coupling without departing from the invention, which is defined by the following claims. In particular, it should be noted that in a coupling having a plurality of flex members connected in series not all of the flex members need have flex elements of different thickness to comply with the invention and, instead, in keeping with the broader aspects of the invention only one, or less than all, of the flex members need be so designed with the remaining flex members possibly each having four flex elements of equal thickness.

I claim:

1. A flexible coupling for use in applications wherein more torque is to be transmitted in one direction of rotation than the other, said coupling comprising a driving member rotatable about a first axis, a driven member rotatable about a second axis generally colinear with said first axis, and a flex member located substantially in a plane generally perpendicular to said first and second axes, said flex member consisting of a first pair and a second pair of elongated flex elements all of which elements are of generally rectangular cross-section throughout the major portion of their lengths, each of said elements having two ends and each element of each of said pairs being of substantially the same length and cross-section as the other element of its pair, the two elements of said first pair having a thickness substantially different from that of the two said elements of said second pair, each end of each of said elements being fixedly joined to an end of an element from the other of said pairs so that said elements form a unitary rectangular arrangement with the two elements of each of said pairs located on opposite sides thereof, said flex member having corners which are the corners of said rectangular arrangement, means fixing said driving member to diagonally opposite ones of said corners of said flex member, and means fixing said driven member to the remaining diagonally opposite ones of said corners of said flex member, said flex member being connected to said driving and driven members in such manner that when said driving and driven members rotate and transmit torque in said one direction of rotation the thinner two of said flex elements are in tension and the thicker two of said flex elements are in compression.

2. A flexible coupling as described in claim 1 wherein said flex elements of said flex member have their thickness dimensions arranged generally perpendicular to said plane.

3. A flexible coupling as described in claim 1 wherein said flex member is of one-piece construction.

4. A flexible coupling comprising a driving member and driven member respectively rotatable about axes of rotation which at least nearly intersect at the location of said coupling, and a flex member located between said driving and driven members, said flex member consisting of four elongated flex elements fixedly joined together in a unitary rectangular arrangement, each of said elements along the major portion of its length having a generally rectangular cross-section as viewed in a plane perpendicular to its longitudinal axis, a first two of said flex elements positioned on opposite sides of said rectangular arrangement having cross-sections generally identical to one another and the remaining two of said flex elements also having cross-sections generally identical to one another, said first two flex elements having a thickness substantially different from the thickness of said remaining two flex elements, said flex member having four corners defined by the corners of said rectangular arrangement, means fixing said driving member to two opposite corners of said flex member, and means fixing said driven member to the remaining two corners of said flex member, said flex member being connected to said driving and driven members in such manner that when said driving and driven members rotate and transmit torque in said one direction of rotation the thinner two of said flex elements are in tension and the thicker two of said flex elements are in compression.

5. A flexible coupling comprising a driving member and a driven member respectively rotatable about axes of rotation which at least nearly intersect at the location of said coupling, a plurality of flex members located between said driving and driven members and arranged in stacked relation to one another along a line extending between said driving and driven members, each of said flex members consisting of four elongated flex elements fixed relative to one another in a unitary rectangular arrangement, each of said flex members having a first two of its flex elements on opposite sides thereof also of substantially the same cross-section relative to one another, at least one of said flex members having said first two of its flex elements of a thickness substantially different from the thickness of said remaining two of its flex elements, said plurality of flex members including two end flex members located at opposite ends of said plurality, means fixing said driving member to two opposite corners of one of said end flex members, means fixing said driven member to two opposite corners of the other of said end flex members, and means fixing two opposing corners of each flex member to two opposing corners of an adjacent flex member, said flex members being connected to said driving and driven members and to one another in such manner that when said driving and driven members rotate and transmit torque in said one direction of rotation the thinner two of said flex elements of said one flex member are in tension and the thicker two of said flex elements of said one flex member are in compression.

6. A flexible coupling as described in claim 5 wherein each one of said plurality of flex members has said first two of its flex elements of a thickness substantially different from the thickness of its said remaining two flex members.

* * * * *